June 12, 1956 G. WALLACE 2,750,165
TRACTOR-MOUNTED CONCRETE MIXER
Filed Sept. 23, 1954
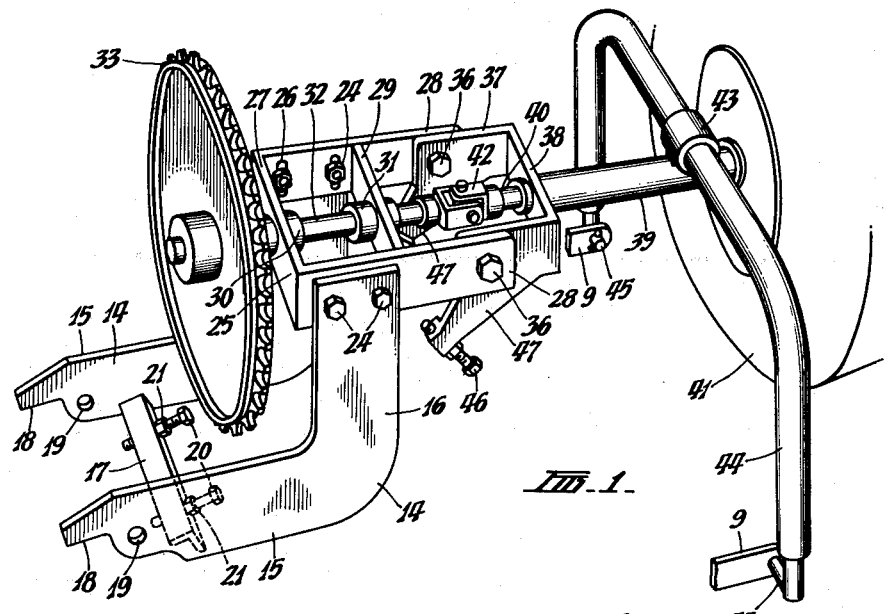

United States Patent Office 2,750,165
Patented June 12, 1956

2,750,165

TRACTOR-MOUNTED CONCRETE MIXER

Geoffrey Wallace, via Wodonga, Victoria, Australia

Application September 23, 1954, Serial No. 457,842

Claims priority, application Australia October 13, 1953

4 Claims. (Cl. 259—177)

This invention relates to a tractor mounted concrete mixer, devised more particularly but not exclusively for use with tractors of the type having a towing and lifting system generally known as a three-point linkage and comprising a pair of lower links or arms projecting rearwardly from and pivotally connected to a tractor at relatively low points in the same plane and a single upper link or arm pivotally connected to the tractor at a relatively high point spaced upwardly from the pivotal points of the lower links or arms. Usually, the upper link or arm is pivotally supported by projections or lugs on the tractor frame.

In such a three point linkage, the pair of lower links are operatively connected to the lifting mechanism, generally hydraulically operated, of the tractor, and upon operation of the latter an implement connected to the three links or arms is swung upwardly and supported in a raised position.

Now the principal objective of this invention is to provide a concrete mixer of simple and durable construction to be mounted upon a tractor and operated by the power take-off, and which is compact, convenient in use and can be manufactured at relatively low cost.

In achieving the above stated principal objective and according to the invention, a concrete mixer to be mounted upon and operated by a tractor comprises a rotary mixing bowl pivotally supported upon the tractor and angularly movable between filling and pouring positions, driving means actuated by the power take-off and drive-connected with the rotary mixing bowl, and a universal drive connection in the driving means angularly deflectible responsive to angular movements of the rotary mixing bowl and adapted to maintain a continuous drive of the rotary mixing bowl in the filling and pouring position and in all intermediate positions.

A more specific objective of the invention is to provide a concrete mixer having the above mentioned characteristics and adapted for use on a tractor of the type having a three point linkage system.

In attaining this more specific objective and in accordance with the invention, the upper link or arm of the three point linkage is replaced by a fixed support rigidly secured to the tractor frame and supporting driving means actuated by the power take-off.

A rotary mixing bowl rotated by the driving means is supported and angularly movable between filling and pouring positions by the lower lifting links of the system, and the driving means is provided with a universal drive connection which deflects in response to angular movements of the mixing bowl while maintaining the drive to the latter, which is continuously rotated in all positions.

The invention will be more readily understood from the following description of the practical embodiment of a concrete mixer as applied to a tractor having a three point linkage, and as depicted in the accompanying drawings.

In these drawings:

Fig. 1 is a view in perspective of the supports of the concrete mixer and the rotary means whereby the latter is driven.

Fig. 2 is a side elevation showing the connection of the supports of the concrete mixer with the tractor and the drive connection of the rotary means with the power take-off of the tractor.

Referring to these drawings in more detail, the reference numeral 5 designates generally the rear end of a tractor, shown diagrammatically, supported upon traction wheels 6 mounted at opposite ends of the rear axle (not shown) having a differential housing 7 from which extends rearwardly a power take-off 8.

The lower links 9 of the three point linkage are mounted upon coaxially aligned pivots 10 on opposite sides of the differential housing 7 and are operatively connected by a link 11 with the power lift (not shown) of the tractor.

Projecting upwardly from the differential housing is the usual pair of lugs 12 one of which is shown in Fig. 2, and carried by and extending between the lugs 12 is a shaft 13 upon which the single upper link or arm (not shown) of the three point linkage is normally supported.

The upper link or arm is removed and replaced by a pair of angular members 14 having horizontal limbs 15 and upright limbs 16.

The limbs 15 are secured in spaced parallel relation by a transverse bracing member 17 of angle section which at the opposite ends is integrally united as by welding, with the limbs 15.

Adjacent the ends 18 of the limbs 15, there are formed in axial alignment apertures 19 through which the shaft 13 extends, and extending through apertures in the transverse bracing member 17 is a pair of adjusting screws 20, carrying locknuts 21.

The screws 20 engage the sides 22 of the lugs 12 and the ends 18 of the limbs 15 are formed as gripping tongues which engage the sides 23 of the lugs 12.

It will be apparent that upon tightening the screws 20 upon the sides 22 of the lugs 12, the angular members 14 will pivot upon the shaft 12 and in so doing will force the gripping tongues 18 into close engagement with the sides 23 of the lugs 12, thereby firmly securing the angular members 14 to the tractor.

It will further be apparent that the assembly of the pair of angular members 14, transverse bracing member 17 and the open frame 25, comprises a fixed support of approximately S formation rigidly secured to the pair of lugs 12 on the tractor frame.

Secured as by bolts 24 to the upper ends of the upright limbs 16 is an open frame 25 having slotted apertures 26 for the bolts 24 for a purpose presently explained.

The open frame 25 is of channel form having a web 27 and sides or limbs 28 rigidly connected by a cross brace 29 parallel with the web 27.

Secured as by welding in apertures in the web 27 and the cross brace 29 are bushings 30 and 31 disposed in axial alignment and comprising bearings for a shaft 32 which projects from the bushing 30 and has secured thereto a sprocket 33 which by a chain 34 is drive-connected with a sprocket 35 mounted upon the power take-off 8.

It will be understood that if desired, the sprockets 33 and 35 may be replaced by pulleys suitable for flat or V belt drive.

Pivotally supported upon bolts 36 disposed in axial alignment in the opposite sides 28 of this open frame 25 is a channel-shaped frame 37 having a transverse web 38 which is provided with a central aperture in which is secured as by welding, an end of a bearing sleeve 39.

In the bearing sleeve 39 there is rotatably mounted a shaft 40 which extends outwardly from the former and has secured thereto a concrete mixing bowl 41.

The shafts 32 and 40 are drive-connected by a universal joint 42, the pivotal axes of which are disposed in alignment with the aligned axes of the bolts 36, while the bearings 30 and 31 and the bearing sleeve 39 and resultantly the shafts 32 and 40 are disposed in a common vertical plane.

It will accordingly be evident that the channel-shaped frame 37 and therewith the bearing sleeve 39 and mixing bowl 41 may be angularly moved about the axis of the bolts 36 in the common vertical plane while the drive connection of the shaft 32 with the shaft 40 and mixing bowl 41 is maintained by the universal joint 42.

In order that the mixing bowl may be raised and lowered, a transversely disposed bearing 43 is welded to the bearing sleeve 39, and in the former there is rotatable an inverted U-shaped yoke 44 having secured to the lower ends stub shafts 45 with which are engaged the eyes or apertures of the free ends of the lower links 9.

In use, the mixing bowl 41 is elevated by the power lift through the link 11, lower links 9, and yoke 44 to the raised filling position shown by full lines in Fig. 2, to receive the concrete mixture which is thoroughly agitated and mixed by rotation of the mixing bowl which is fitted with vanes, fins or like agitating means.

Upon the concrete being sufficiently mixed, the power lift is operated to lower the mixing bowl 41 to the pouring position indicated by broken lines in Fig. 2.

The extent to which the mixing bowl may be lowered, i. e. the height of the pouring position above ground level, may be adjusted by screws 46 mounted in threaded apertures in the ends of downwardly extended lugs 47 on the channel shaped frame 37 and adapted to engage the lower edge of the cross brace 29.

It will be apparent that by outward screwing of the screws 46 from the lugs 47, the pouring position will be lowered, while inward turning of the screws will extend the points of the same from the lugs so as to raise the pouring position.

It will be further apparent that through the medium of the universal joint 42, the mixing bowl 41 may be continuously rotated in the filling position, the pouring position, and in being moved from either position to the other.

I claim:

1. A concrete mixer for a tractor having a rearwardly positioned power take-off and a pair of rearwardly extended power-operated lifting links spaced apart in parallel relation and pivotally connected to the tractor frame, said concrete mixer comprising a transverse support positioned above the lifting links and having downward extensions jointedly connected to the ends of said links, a central support located above the lifting links and detachably fixed to the tractor frame, an angularly movable support pivotally mounted upon the central support, a bearing sleeve integral with the angularly movable support and pivotally connected with the transverse support, a driving shaft rotatably mounted in the central support and drive connected with the power take-off, a driven shaft rotatably mounted in the bearing sleeve, a universal connection drive connecting the driving shaft with the driven shaft, and a mixing bowl secured to the driven shaft.

2. A concrete mixer for a tractor having a rearwardly positioned power take-off and a pair of rearwardly extended power-operated lifting links pivotally connected to the tractor frame, said concrete mixer comprising an inverted transversely disposed yoke located above the lifting links and having the lower ends of the opposite limbs jointedly connected to the ends of said links, a supporting frame comprised of a pair of angular members braced together in parallel relation and located centrally above the lifting links, horizontally disposed limbs on the angular members detachably connected to the tractor frame, vertically disposed limbs upstanding from the horizontally disposed limbs, an open frame secured to and extending horizontally from the vertically disposed limbs, an angularly movable frame mounted upon pivots disposed in alignment in opposite sides of the open frame, a bearing sleeve integral with the angularly movable frame and pivotally connected with the transversely disposed yoke, a driving shaft rotatably mounted in the bearing sleeve, power transmission means drive connecting the driving shaft with the power take-off, a driven shaft rotatably mounted in the bearing sleeve, a rotary mixing bowl secured to the driven shaft, and a universal connection drive connecting the driving shaft with the driven shaft and disposed in alignment with the oppositely aligned pivots supporting the angularly movable frame whereby responsive to raising and lowering of the yoke by the lifting links and resultant pivotal movements of the angularly movable frame the rotation of the mixing bowl is maintained.

3. A concrete mixer for a tractor as claimed in claim 2, having means for detachably fixing the angular members to the tractor frame, comprising a bracing member integral with the horizontally disposed limbs and securing the angular members in parallel relation, a pair of projections having angularly related sides spaced apart on the tractor frame, a transversely disposed shaft extending through apertures in the projections and apertures in the horizontally disposed limbs, gripping tongues on the ends of the horizontally disposed limbs, and clamping screws in the bracing member operable to engage one of the sides of the projections and urge the gripping tongues into forced engagement with the opposite sides of said projections.

4. A concrete mixer for a tractor as claimed in claim 2, having means for limiting the downward movement of the mixing bowl and determining the pouring position, comprising an adjustable screw in the angularly movable frame engageable with a stop on the open frame.

References Cited in the file of this patent

UNITED STATES PATENTS 2,594,904   Frohring _____ Apr. 29, 1952